United States Patent Office 3,406,490
Patented Oct. 22, 1968

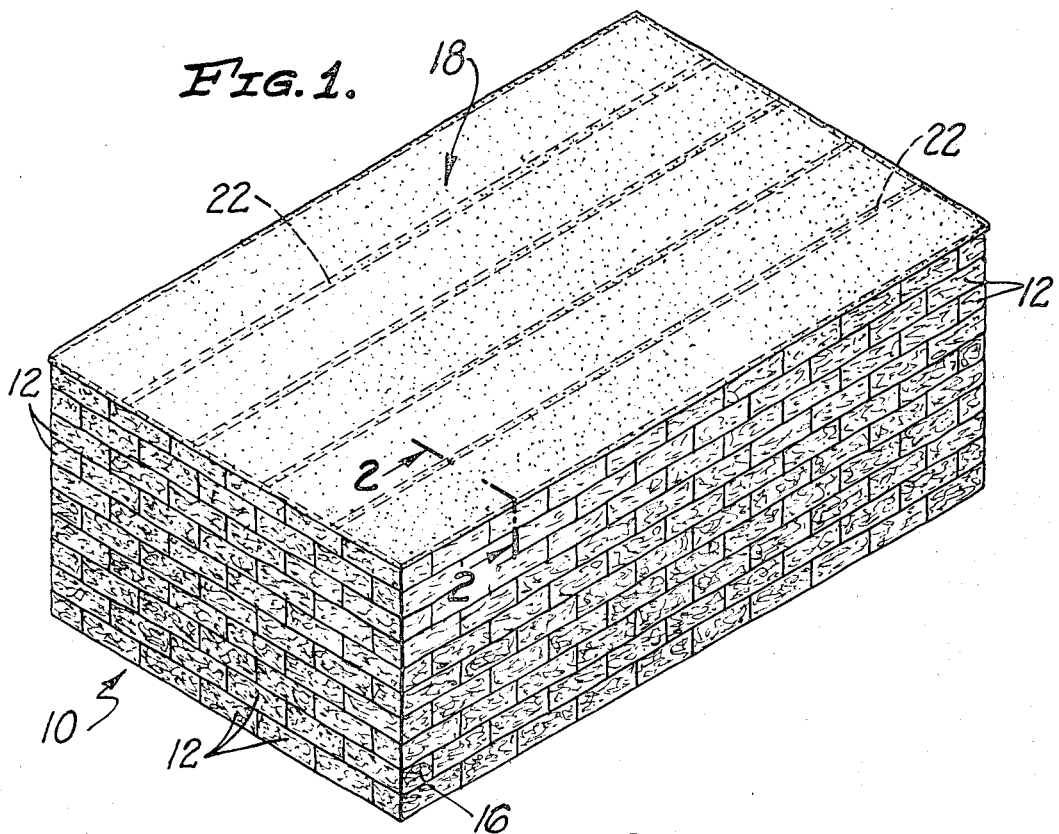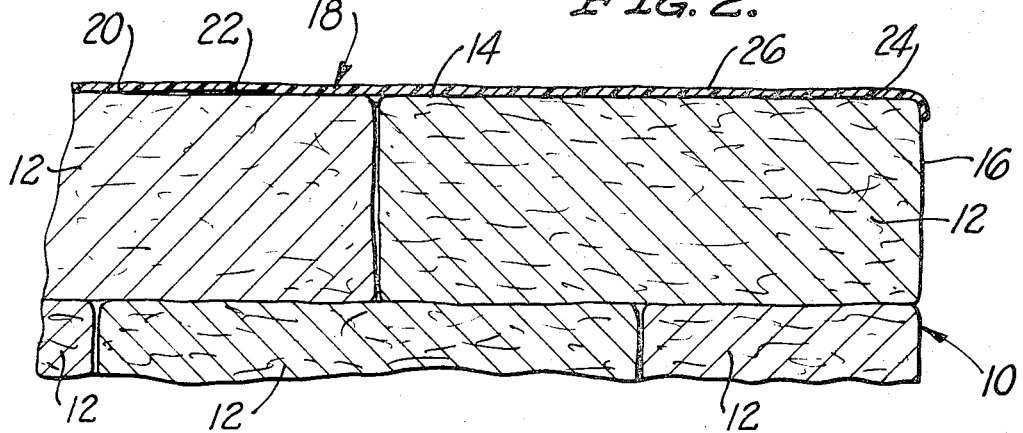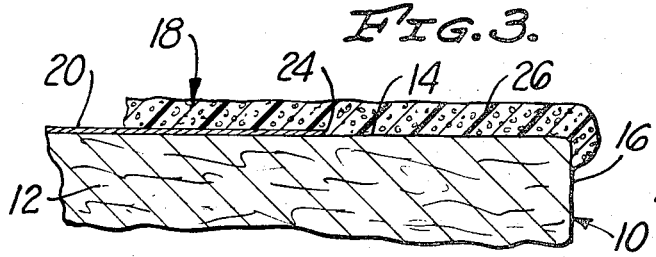

3,406,490
ARTICLE WITH SEALED COVER AND METHOD OF FORMING SAME
David L. Mudd, 2445 Sierra Drive, Upland, Calif. 91786
Filed Nov. 7, 1966, Ser. No. 592,585
10 Claims. (Cl. 52—3)

ABSTRACT OF THE DISCLOSURE

An article formed by stacked bales of hay and the like has the upper surface thereof at least partially covered by a nonadhering flexible membrane. A preferably foamed plastic, ultimately stiffening, is sprayed over the membrane and substantially totally around the membrane extremities onto the stacked bales, adhering to the bales and sealing the membrane extremities. The foamed plastic preferably extends down over sides of the bales at the article periphery.

---

This invention relates to a covered article, such as a stack of baled hay and the like, which requires a covering for protection of the same from the elements. More particularly, this invention relates to an article of the foregoing type having a cover thereon formed in a unique manner by the combination of a membrane substantially covering the upper surface of the article and having a plastic coating over said membrane and said article upper surface, which plastic coating serves to retain the entire cover in place and seal the same against dislodgment by the wind and other elements.

There are many occasions where articles of relatively large size are required to be stored outside and normally subject to the elements, such as wind, rain and snow. One example of such an article might be a stack formed from bales of hay, such a stack frequently being found adjacent a farm building.

It is true that baled hay may be stacked within a farm building in order that the same might be protected from the elements, but this is both time and space consuming and it is most desirable that such stack be formed exteriorly of the farm buildings, even though the problem of protecting the same from the elements is presented. Furthermore, there are many occasions where it is impossible for a particular farmer to grow the entire amount of hay required for consumption on his particular farm, in which case he would purchase a quantity of baled hay from a farmer having a surplus thereof. In many cases it is undesirable to move such purchased quantity of baled hay to the farm where the same is to be consumed so that again problems of storage are presented.

Prior to the present invention, the most common form of covering used for stacks of baled hay which are formed exteriorly of the farm buildings and require protection from the elements has been one of either a canvas tarpaulin or sheets of flexible plastic material. In the case of canvas tarpaulins, the size of the stack or article to be covered is determined by the size of the tarpaulin available and a canvas tarpaulin is of limited life due to rotting caused by exposure to the elements and the obvious difficulty of tying the same down against the force of the elements. In the case of sheets of flexible plastic material, although the size of the stack is virtually unlimited with overlapping of said sheets and the relative inexpensive cost of said sheets, it is extremely difficult to retain flexible plastic sheets in place, since any slight wind leakage thereunder will quickly destroy and remove the same.

It is, therefore, an object of my invention to provide a covered article, such as a stack of baled hay and the like, for protection of the same against the elements wherein the cover for the article may be formed of relatively inexpensive material and of virtually any size solely determined by the size of the article to be covered, yet said cover will provide adequate protection for the article against the elements. Thus, making use of the principles of the present invention, articles of virtually any size may be temporarily stored exterior of any building structure for a relatively long period of time and will be sufficiently protected from the elements to prevent any appreciable damage to the same. In the case of stacks of baled hay, the cover for the stack is adapted to the size of the stack at the time it is desired to cover the same and the methods and procedures for forming the cover are the same despite such stack size.

It is a further object of my invention to provide a covered article of the foregoing type in which the cover for said article is formed by the combination of a relatively flexible membrane substantially covering the upper surface of the article and a coating of plastic material overlying said membrane and said article upper surface. The membrane may be applied to the article upper surface from rolls, with strips of the membrane overlapped to substantially cover the article upper surface, with the layer of plastic material being sprayed thereover so as to provide a stiffened plastic layer. The membrane may be virtually any sheet material, such as paper or tar paper or any of the usual plastic sheet materials, all of which are preferably impervious to the plastic layer applied thereover.

It is also an object of my invention to provide a method of protecting articles, such as stacks of baled hay and the like from the elements, wherein a cover is formed over said stacks in a relatively simple manner, said cover being adapted to the size of stack at the time of formation thereof and being determined solely by the size of said stack. For the maximum benefits of the present invention, it is preferred that during the application of the membrane over the upper surfaces of the stack to maintain said membrane spaced inwardly from side surfaces of the stack. Thus, upon application of the plastic layer over the membrane, the plastic layer may be formed to completely cover the stack upper surface, thereby adhering to the stack at the edges of the membrane and preventing wind and the other elements from penetrating beneath the membrane.

Other objects and advantages of the invention will be apparent from the following specification and the accompanying drawing which is for the purpose of illustration only, and in which:

FIG. 1 is a perspective view illustrating a covered stack of baled hay formed according to the present invention;

FIG. 2 is an enlarged, fragmentary, vertical, sectional view taken along the broken line 2—2 in FIG. 1; and FIG. 3 is a still further enlarged, fragmentary, vertical, sectional view similar to FIG. 2 and more clearly showing details of a top corner of the covered stack of FIG. 1.

Referring to the drawing, a stack generally indicated at 10 is formed of bales of hay 12, said stack having a top surface 14 and side surfaces 16. Although, as illustrated herein, the particular stack 10 is formed with a rectangular perimeter, it will be obvious from an understanding of the principles of the present invention, that a stack of virtually any configuration may be used. Furthermore, it will further be obvious that many other types of articles may be covered in the same manner set forth in the present invention and for similar purposes.

A cover, generally indicated at 18, is applied over the stack top surface 14 and includes a membrane 20 which may be laid over said stack top surface from rolls in strip form, said strips being overlapped in usual manner to cover said top surface, as indicated at 22 in FIGS. 1 and 2.

It is preferred in forming the membrane 20 that the side extremities or edges thereof, indicated at 24, will be maintained spaced inwardly from the stack side surfaces 16 completely around the perimeter of the stack 10. The cover 18 is completed by applying a layer of plastic material 26 overlying and completely covering the membrane 20 and the stack top surface 14, including that area of the stack top surface outward of the membrane, said layer also preferably extending partially down the stack side surfaces 16 completely around the perimeter of the stack.

The plastic material layer 26 is preferably sprayed in place, adhering to both the membrane 10 and the stack top and side surfaces 14 and 16. Furthermore, upon drying of the layer 26, said layer will stiffen the membrane 20, sealing the membrane side extremities 24 and preventing wind and other elements from penetrating beneath the membrane due to the adherence or sealing of the layer with the stack top and side surfaces. Thus, the cover 18 is retained securely in place and will reasonably protect the stack 10 formed by the bales of hay 12 from the elements, even though the stack is positioned exterior of any other covering.

The membrane 20 may be formed of rolled strip paper, such as usual wrapping paper, or tar paper or the usual thin and flexible sheet plastic materials, such as polyester resin, all of which are substantially impervious to the plastic material used for the layer 26. In this manner, in use of the bales of hay 12 from the stack 10 after being protected for a period of time by the cover 18, there will be no adherence between the cover and the individual bales of hay, except at those bales of hay which are located projecting beyond the side extremities 24 of the membrane 20. Furthermore, the membrane 20, as positioned in the final cover 18, may be in overlapped strip form, as described, or could be formed of a single sheet, although the latter will present difficulties in handling where the stack 10 is of a size presenting a relatively large top surface 14.

As stated, the layer of plasitc material 26 may be sprayed in place to form the composite cover 18, or may be otherwise applied in any usual manner. The composition of the layer of plastic material 26 may be a quick rising foam which is foamed in place, such as polyester resin with a foam causing catalyst, or other forms of foamed plastic material, such as polyurethane or polystyrene foams. Also, the layer of the plastic material 26 may be formed of nonfoaming plastic materials, the prime requisite being that the plastic material will dry or set in stiffened form so as to provide a stiffened covering for the membrane 20, and further that the plastic material will adhere at least to the bales of hay 12 in the stack 10 outward of the side extremities 24 of the membrane 20 and at the stack side surfaces 16 where the layer of plastic material is carried downwardly over a part of said side surfaces.

It is still further possible to form the membrane 20 of sheet cellophane or polyethylene, depending on the availability of the various membrane materials. In the case of sheet polyethylene, most of the foamed plastic materials forming the layer 26 will not adhere thereto, although still adhering to the stack top and side surfaces 14 and 16 outward of the side extremities 24 of the membrane. In any event, a thickness of foamed plastic in the order of ¼ to ½ inch is sufficient to provide the layer 26, and the thickness of nonfoaming plastics would be slightly less.

Thus, I have provided, according to the present invention, a covered article and method of forming the same wherein the article may be of virtually any size and the composite cover 18 formed by the membrane 20 and the layer of plastic material 26 will provide adequate protection for the article against the elements. Furthermore, the cover 18 of the present invention eliminates the requirements for any tie downs or similar fastening means and the size thereof may be readily determined and formed at the particular site of the article to be covered. Still further, the composite cover 18 having all of the foregoing qualities and satisfying all of the objects hereinbefore stated, is quickly and simply formed with a minimum of time and labor from materials of minimum cost.

I claim:

1. In a covered article for protection against the elements, the combination of: an article to be covered such as stacked bales of hay and the like, said article having an upper surface terminating at side surfaces; a flexible membrane over at least a major part of said article upper surface nonadhering to said upper surface; and a layer of stiffened plastic material overlying at least a part of said membrane and said article upper surface, said plastic layer adhering to certain of said article surfaces beyond and substantially totally around extremities of said membrane sealing said membrane extremities to said article.

2. A covered article as defined in claim 1, in which said stiffened plastic layer completely covers said article upper surface and extends downwardly partially over said article side surfaces around the perimeter of said article upper surface.

3. A covered article as defined in claim 1, in which said membrane terminates spaced inwardly of said article side surfaces; and in which said plastic layer extends over said membrane extremities and onto said article upper surface.

4. A covered article as defined in claim 1, in which said membrane terminates spaced inwardly of said article side surfaces; and in which said stiffened plastic layer extends over said membrane extremities onto said article upper surface and extends downwardly partially along said article side surfaces around the perimeter of said article upper surface, said plastic layer adhering to said article upper surface outwardly of said membrane and to said article side surfaces.

5. A covered article as defined in claim 1, in which said stiffened plastic layer is formed of a foamed plastic material.

6. A covered article as defined in claim 1, in which said flexible membrane is impervious to the plastic material of said stiffened plastic layer.

7. In a method of protecting articles such as a stack of baled hay and the like from the elements, the steps of: positioning a membrane over at least a major part of an upper surface of said article; maintaining said membrane nonadhering to said article upper surface; and applying a plastic material which stiffens in final form over at least a part of said membrane and article upper surface extending beyond and substantially totally around extremities of said membrane and adhering to certain of surfaces of said article beyond said membrane.

8. A method as defined in claim 7, in which said step of positioning said membrane includes the maintaining of said membrane during said positioning spaced inwardly of sides of said article; and in which said step of applying said plastic material includes the covering of at least a part of said article upper surface and membrane with said plastic material and during said covering, adhering said plastic material to said article upper surface outwardly of and substantially totally around extremities of said membrane.

9. A method as defined in claim 7, in which said step of positioning said membrane includes the maintaining of said membrane spaced inwardly from side surfaces of said article around the perimeter of said article upper surface; and in which said step of applying said plastic material includes the covering of at least a part of said article upper surface with said plastic material and extending said plastic material beyond and substantially totally around extremities of said membrane and downwardly partially over said article side surfaces around said perimeter of said article upper surface, and during said covering of said article upper surface and said downward extension of said plastic material over said article side surfaces, adhering said plastic material to said article upper surface outwardly of said membrane substantially totally around extremities thereof and to said article side surfaces.

10. A method as defined in claim 7, in which said step of applying a plastic material includes the spray foaming of said plastic material which stiffens in final form over said membrane and article upper surface.

References Cited

UNITED STATES PATENTS

| | | | |
|---|---|---|---|
| 1,551,427 | 8/1925 | Pfister | 99—8 |
| 1,664,635 | 4/1928 | Magill | 117—6 |
| 2,145,284 | 1/1939 | Anderson et al. | 52—169 |
| 2,204,781 | 6/1940 | Wattles | 117—6 X |
| 2,333,887 | 11/1943 | Redlinger | 117—6 X |
| 2,584,241 | 2/1952 | Stewart | 117—6 X |
| 2,779,689 | 1/1957 | Reis | 117—104 |
| 2,768,896 | 10/1956 | Lewis | 52—3 X |
| 3,170,828 | 2/1965 | Irvine | 52—80 X |

FOREIGN PATENTS

| | | |
|---|---|---|
| 102,155 | 9/1937 | Great Britain. |

OTHER REFERENCES

Modern Plastics, October 1953 (52/309) "New Job for Sprayed-On Plastics," pp. 93–97.

FRANK L. ABBOTT, *Primary Examiner.*

C. G. MUELLER, *Assistant Examiner.*